Aug. 25, 1964   H. W. KAATZ ETAL   3,145,731
VACUUM REGULATING VALVE
Filed Nov. 29, 1961
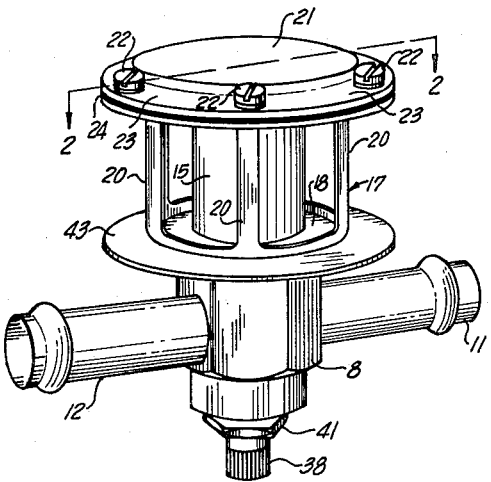
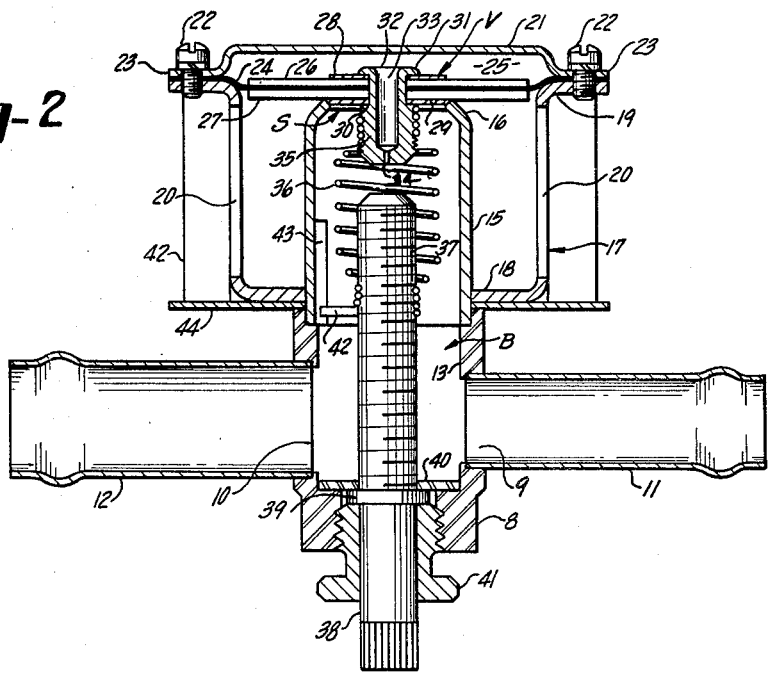
INVENTOR.
HERBERT W. KAATZ
LEO TOBACMAN
BY Bosworth, Sessions,
Herrstrom & Knowles
ATTORNEYS

United States Patent Office 3,145,731
Patented Aug. 25, 1964

1

3,145,731
VACUUM REGULATING VALVE
Herbert W. Kaatz, Elyria, and Leo Tobacman, Cleveland Heights, Ohio, assignors to Randolph Mfg. Co., Cleveland, Ohio, a corporation of Ohio
Filed Nov. 29, 1961, Ser. No. 155,758
13 Claims. (Cl. 137—510)

This invention relates to regulating valves and in particular to vacuum regulating valves which are intended to provide and maintain a steady and regulated amount of vacuum from a pulsating and variable source of vacuum.

Such valves are particularly well adapted for use in connection with suction-air powered gyroscopic flight instrument systems and are intended for installation between aircraft engine driven vacuum pumps and the suction-air driven gyroscopic instruments normally employed for altitude instrument flying. These instruments include artificial horizons, directional gyros and turn and bank indicators. Conventional directional gyros and artificial horizons nominally require a pressure drop of four inches of mercury between their free air intake and the vacuum line connection. The air volume necessary to produce the required pressure drop varies from 2.3 standard cubic feet per minute through artificial horizon to 1.3 standard cubic feet per minute through the direction gyro. Conventional air driven turn and bank indicators operate on a pressure drop of about two inches of mercury usually provided by a fixed orifice that also limits the air flow to about 0.5 cubic foot of air per minute.

The engine driven vacuum pumps are conventionally of a positive displacement type and are mounted on the accessory section of the aircraft engine and driven by accessory drives geared directly to the engine crankshaft. In normal in-flight operation, the engines may drive the pump through a wide speed range, as for example, between 2000 r.p.m and 5000 r.p.m. from the extremes of an instrument letdown in slow flight to take-off conditions. This pump speed range results in an approximately directly proportional range of volumes of air output from typical positive displacement type vacuum pumps.

The vacuum regulating valve, therefore, must be able to provided and maintain the gyro instruments with a substantially constant vacuum and volume of air through them from a vacuum pump delivering a wide range of outputs. The ability to closely regulate the vacuum at the instruments has a direct effect on instrument reliability and operation. Any departure from optimum operating pressure conditions invites precession, general instrument sluggishness and shortening of the life of the instrument. In addition, all instruments are calibrated at a discreet pressure level and, therefore, and departure of this pressure level during operation of the instrument introduces extraneous errors.

An additional problem involved in the operation of such vacuum regulating valves results from the pulsations in the line produced by positive displacement type pumps such as a multi-bladed vane type vacuum pump. Such pulsations and vibrations cause the conventional vacuum relief valve to chatter and vibrate at an exciting frequency determined by the pump speed and number of blades on its rotor in the case of a vane pump. The engine and air frame structure also introduce sources of troublesome vibrations. This chatter is produced by the hammering and striking together of the valve closure and valve seat at some natural resonant frequency coupled with an exciting frequency and constitutes an undesirable high level noise source when the vacuum relief is trying to maintain anything like a constant vacuum for the instruments over a range of pump speeds.

The object of our invention, therefore, is to provide a vacuum regulating valve for providing and maintaining a substantially constant vacuum from a source of variable vacuum. Another object is to provide such a valve which operates without hammering contact between the valve closure and valve seat throughout a wide range of engine or structural vibrations and the exciting frequencies of pump-produced pulsations in the vacuum line. Another object is to provide a vacuum relief valve having inherently stable and predictable regulating characteristics and the ability to provide a high degree of regulation over a wide range of operating conditions commonly experienced in aircraft operation. Another object is to provide a relatively larger area filter for the atmospheric air handled by the regulator than usually possible in conventional regulators. Still another object of our invention is to provide such a vacuum regulating valve that is relatively simple and inexpensive to manufacture and which is easily and conveniently set and adjusted to maintain and deliver a desired level of vacuum.

Briefly, our invention consists of a vacuum regulating valve adapted to be installed in the vacuum line between an engine driven vacuum pump and gyro instruments and having valving means for introducing and throttling atmospheric air into the vacuum system in the proper amounts required to maintain a constant vacuum on the instruments. The valving means comprises a valve seat and valve closure to operate in the manner of a substantially undamped and tuned harmonic oscillator having a resonant frequency lying substantially outside the range of exicting frequencies of pulsations introduced into the vacuum system by the pump. Thereby, the amplitude of oscillation of the valve closure with respect to the valve seat can be predicted and controlled and hammering or chattering therebetween is eliminated.

The foregoing and other objects of our invention will become apparent from the following description of a preferred embodiment thereof taken together with the accompanying drawings in which:

FIGURE 1 is a perspective view of a preferred embodiment of a regulating valve embodying our invention; and FIGURE 2 is a cross-sectional view of slightly enlarged scale of the valve shown in FIGURE 1 taken in the plane of line 2—2.

The valve consists generally of a vacuum chamber B adapted to be inserted in the vacuum line between the pump and the air-driven instruments and having a controllable orifice or port opening to atmosphere for introducing atmospheric air into the vacuum system. The throttling of atmospheric air through the orifice and into the vacuum system is accomplished by means of a valve seat S and a valve closure assembly V which define the orifice and which act together in response to variations in the level of the regulated vacuum to open or close the orifice more or less and in accordance with the departure of the regulated vacuum level from a predetermined level.

More particularly and as shown in the drawings, the valve preferably consists of a vertically bored valve body 8 having transversely aligned inlet and outlet ports 9 and 10, respectively. Fixed tubular 11 and 12 are fitted within the inlet and outlet ports 9 and 10, respectively for connection of the valve into the vacuum system. The lower end of an upstanding cylindrical sleeve 15 is fitted in one end of vertical bore 13 in body 8 and, together with body 8, forms vacuum chamber B. The peripheral edge portion 16 of the upper end of sleeve 15 is turned inwardly as shown in FIGURE 2 to form an annular valve seat S.

A housing spider or cage, generally indicated at 17, of cylindrical form surrounds sleeve 15 as shown most clearly in overall form in FIGURE 1 and also in cross section in FIGURE 2. Spider 17 has a radial base flange 18 encircling sleeve 15 near its lower end and adjacent housing 8. An upper radial flange 19 is spaced above and concentric with base flange 18 and valve sleeve 15 by a number of legs 20 standing in generally circular fashion and extending between and interconnecting flanges 18 and 19 to form a substantially open cylindrical side wall. As seen in FIGURE 2, upper flange 19 lies in a plane slightly above the upper end 16 of sleeve 15.

A circular flanged cap 21 having a raised central area covers the upper opening of housing spider 17 and is attached thereto by means of a number of machine screws 22 passed through holes drilled in the flange 23 of cap 21 and turned into tapped bores in upper flange 19 of spider 17. Clamped between the flange portion 23 of cap 21 and flange 19 of spider 17 is a flexible diaphragm 24 which carries valve closure assembly V and, together with cap 21, forms a closed air chamber 25.

Valve closure assembly V preferably includes two valve discs 26 and 27 of slightly less diameter than the unclamped portion of diaphragm 24 and of greater diameter than annular valve seat S mounted on opposite sides of diaphragm 24 concentrically of valve sleeve 15. Washers 28 and 29 are held in place above and below and are clamped together with discs 26 and 27, respectively, to either side of diaphragm 24 and concentrically of valve sleeve 15 between a shoulder 30 and the upset end 31 of rivet 32 axially aligned with valve sleeve 15. Washer 29 has a controlled clearance fit within the opening provided by the in-turned edge 16 of valve sleeve 15 and, together with metallic disc 27 and annular valve seat S, defines an orifice for establishing controllable communication between the vacuum system and atmosphere.

Rivet 32 is provided with a counterbore 33 entering its end 31 and terminating in a fine orifice 34 extending through the rivet to its other end. Fine orifice 34 acts as a bleed opening or vent into otherwise sealed air chamber 25 to maintain chamber 25 at the variable mean level of pulsating vacuum in vacuum chamber B of the valve.

Rivet 32 is provided with an externally threaded portion 35 extending below diaphragm 24 and adapted to receive and engage the small upper coils of a tension spring 36. The other end of tension spring 36 is adapted to receive the threaded portion 37 of an adjusting member 38 for varying the tension in spring 36. Adjusting member 38 extends out through the lower end of valve body 8 and is secured against axial movement and may be locked in a fixed position of rotation by means of annular flange 39 thereon adapted to bear against and be clamped between an apertured disc 40 fixed in the lower portion of bore 13 of valve body 8 and a bored bearing and lock screw 41 turned into the lowermost threaded portion of bore 13. Spring 36 is secured against rotation while permitting axial displacement upon the turning of adjustment means 38 by a finger 42 extending radially outward for engagement in an axial groove 43 on the wall of valve sleeve 15. With spring 36 thus prevented from rotating and adjusting member 38 secured against axial movement, rotation of adjusting member 38 acts to vary the tension in spring 36 and thus the force tending to urge valve closure assembly V against valve seat S as threaded portion 37 is turned into and out of the small lower coils of spring 36. Adjusting member 38 may be locked in a particular rotational position and thus the tension on spring 36 fixed by turning lock screw 41 into body 8 and clamping annular flange 39 between bearing disc 40 and the end of lock screw 41.

Atmospheric air introduced into the vacuum system between valve seat S and valve closure assembly V may be conveniently filtered by means of a large area porous elastic garter 42 placed around housing spider 17 and confined between upper flange 19 thereof and a lower retaining flange 44 mounted on and surrounding sleeve 15 for this purpose. In FIGURE 1, garter 42 is removed to reveal more of the valve. In FIGURE 2, garter 42 appears in cross section.

In operation, beaded tube 11 is connected to the gyro instruments and beaded tube 12 is connected to the vacuum pump source of suction air. When the engine is started and the pump begins to draw air through the instruments and the valve, tension spring 36 holds valve disc 27 against and washer 29 substantially within the in-turned annular edge 16 of valve sleeve 15 thereby keeping the orifice or opening between atmosphere and the interior of the valve or vacuum chamber B closed. As the pump delivers air drawn through the instruments, a vacuum or sub-atmospheric pressure is created in chamber B of the valve due to the pressure drop through the instruments. This vacuum draws the air from chamber 25 above diaphragm 24 through fine bleed orifice 34 and reduces the pressure in chamber 25. When the vacuum in chamber 25 acting over the area of diaphragm 24 produces a force sufficient to overcome the tension force of spring 36, the valve closure assembly V is lifted off valve seat S admitting atmospheric air to the system. Thereafter, valve closure assembly V seeks a position of equilibrium whereby a sufficient proportion of the total air being delivered by the pump is drawn through the instruments to produce the necessary vacuum level in chamber 25 to balance the tension in spring 36. The balance of the air being delivered is made up from atmosphere and enters the annular orifice formed between valve seat S and valve closure assembly V. By adjustment of the tension of spring 36, the vacuum in chamber 25 necessary to balance spring 36 may be varied and thus the vacuum applied to the instruments set for their optimum operation.

As variations in engine and pump speed produce proportional variations in the amount of air drawn from the system and delivered by the pump, the valve closure assembly V automatically seeks and assumes a new equilibrium position with respect to valve seat S such that the amount of air drawn through the instruments remains substantially constant and thus the vacuum applied to the instruments is closely held to the desired value.

For example, when the pump speed increases, it delivers a proportionally greater amount of air, part of which increased amount is drawn through the instruments. This produces an increase in the pressure drop through the instruments and an increase in vacuum in the system and valve, including chamber 25. Valve closure assembly V in turn is lifted farther away from valve seat S, increasing the amount of air entering the system through the valve and restoring the amount of air drawn through the instruments to the desired value. The vacuum level in the system and on the instruments then returns substantially to its preset value as determined by the tension in spring 36. Any additional increment in vacuum required in chamber 25 to maintain the new equilibrium position of valve closure assembly V and thus the closeness of regulation provided by the valve can be minimized to a very substantial extent by using a long low-rate tension spring having a relatively flat force displacement characteristic at least throughout the limited range of displacement encountered and by providing a relatively large area valve seat opening so that substantial changes in the volume of air passed through it can be accomplished by relatively small displacements of valve closure member V with respect to valve seat S. Any adverse effects on the regulation characteristics of the valve produced by high velocity air flow is reduced by minimizing sharp bends, narrow passages and, in general, areas within the valve where high velocity air flow is controlled. On one typical application of a suction-regulating valve embodying our invention in a light twin engine airplane, it was possible to hold the vacuum at the artificial horizon case between 4.2 and 4.3 inches of mercury over an engine crankshaft speed range of from 1500 to 2575 r.p.m. which is as much as ten times better than the regulation provided by some known, accepted and approved regulating valves.

Further, in the operation of a vacuum system embodying a positive displacement type pump, pulsations occur in the vacuum line of a frequency dependent upon pump speed and design. For example, a single offset sliding vane type pump produces pulsations of a frequency equal to the product of rotor speed and the number of rotor vanes. These pulsations tend to produce a forced harmonic oscillation in conventional vacuum regulating valves at the frequency of the exciting pulsations which results in deleterious and noisy chattering of the valve closure against the valve seat. If the exciting frequency of the pulsations approaches the resonant frequency or its near harmonics of the valve mechanism, its operation becomes unstable with a resultant increase in the forces driving the valve and valve seat together and a decrease in regulation ability. The efforts most commonly employed to reduce these undesirable results have been directed to ways and means for increasing the resistive forces or friction in the valve mechanism and have met with only limited success.

In the vacuum regulating valve of our invention, we employ a different, if not opposite, approach to the problem. The valve can be considered as a harmonic oscillator in which a mechanical restoring force supplied by a relatively long low-rate spring 36 and a pneumatic restoring force supplied by the volume of air in chamber 25 acts as a short high-rate spring on assembly V. The pulsations, of course, will have little, if any, effect on the spring constant of the air volume in chamber 25 because of the fineness of orifice 34 in rivet 32. The resistive forces are kept to a minimum with the principal resistive force being produced in diaphragm 24. This force is of a relatively low value when supplied by the neoprene rubber-impregnated nylon diaphragm we prefer to employ.

The mass of the moving parts of valve closure assembly V and the spring constants of the restoring forces are selected so that the resonant frequency of the assembly is substantially outside of the normal range of exciting frequencies of the pump pulsations exciting the oscillator. The oscillation and operation of the valve, therefore, is inherently stable. Additionally, mass and spring constants are selected to produce amplitudes of oscillation for all normally encountered speeds of operation of the pump and conditions of valve opening that will be less than the correspondingly required physical separations between valve closure assembly V and valve seat S at such speeds and conditions. Such selection is possible by studying a series of operating conditions in terms of valve closure and seat separation and then translating these values into allowable amplitudes of oscillation at the particular operating conditions. In this manner, freedom of contact between the valve closure and seat is obtained throughout a whole finite range of engine speeds together with the resultant substantial decrease, if not elimination, of undesirable noise and high rate of deleterious wear during operation of the regulating valve.

The foregoing operational characteristics and favorable results have been achieved in successful operation of a vacuum regulating valve embodying our invention and similar to the preferred form thereof described above. The physical specifications of such a valve, given by way of example and not of limitation, are as follows:

Diameter of valve seat S_____inches__ 0.625
Effective diameter of diaphragm 24_____do____ 1.625
Approximate volume of chamber 25__cu. inches__ 0.25
Diameter of fine orifice 34_____inches__ 0.016
Effective mass of moving parts_____ounces__ 0.219
Spring constant of spring 36_____lbs./inch__ 10
Spring constant of pneumatic spring_____do____ 120

Such a valve successfully operates without chatter and/or substantial contact between valve seat and valve closure while regulating the vacuum delivered within 3% of a desired vacuum of 4 inches of mercury demanding 4 cubic feet of air per minute from a 4-bladed vane type vacum pump delivering from 8 to 10 cubic feet of air per minute when driven through a 1.5:1 accessory drive ratio over an engine speed range of 1500 r.p.m. to 3200 r.p.m. The frequency of pulsations in the system thus vary between 150 c.p.s. and 320 c.p.s., placing a resonant frequency of 300 c.p.s. computed at maximum volume in chamber 25, outside the range of exciting frequency. The resonant frequency of the valve described above rises with an increase in the volume of air per unit of time delivered by the pump due to the correspondingly increased separation required between valve seat and valve closure assembly and consequent stiffening of the pneumatic spring because of the decreased volume of chamber 25, the frequency of the pulsations exciting the oscillations increases at the same time so that exciting frequency stays well above the resonant frequency of the system.

In the valve physically and operationally specified above, the maximum separation of the valve closure assembly from the valve seat during normal operation is about 0.050 inch with lift-off of the valve closure assembly occurring at an exciting or pulsation frequency of about 150 c.p.s. or 1500 engine r.p.m. Lift-off and quiet operation of the valve at or near lift-off operating conditions is enhanced by the use of a washer such as washer 29 which fits within the valve seat with a clearance of from 0.010 to 0.020 inch all around. This washer is approximately 0.025 inch thick with its lower annular edge rounded off to a radius of about 0.010 inch. The extra thickness provided the valve closure assembly by this washer extending within the valve seat and atmospheric port compels high motion for the initial opening or lift-off of the valve closure.

A further advantage of the valve of our invention contributing to its successful and stable operation is the absence of mechanical compression springs and the use rather of a mechanical tension spring which is geometrically stable and has a natural tendency to stay straight on its axis. Also, it cannot be adjusted to a solid height.

Changes, modifications and improvements may be made to the above-described preferred and modified form of our invention without departing from the precepts and principles of the invention. Therefore, we do not wish our patent to be limited to the particular form of our invention specifically illustrated and described nor in any manner inconsistent with the extent to which our invention has promoted the art.

We claim:
1. A regulating valve for delivering a desired maximum level of vacuum when supplied a pulsating vacuum of correspondingly varying frequency and mean pressure level, said valve comprising
 a vacuum chamber having a supply port, a delivery port and an atmospheric port opening to atmosphere,
 a valve seat surrounding said atmospheric port,
 a valve closure mounted on a diaphragm for oscillatory movement of varying amplitude and frequency toward and away from said valve seat for throttling air flow through said atmospheric port,
 pneumatic spring means having ready response to the mean pressure level in said vacuum chamber for tending to draw said diaphragm and said valve closure away from said valve seat in accordance with the mean pressure differential across said atmospheric port and having limited response to transient pulsations in the pressure level in said vacuum chamber and
 mechanical spring means tending to urge said valve closure toward said valve seat with a substantially constant and predetermined force
 whereby greater or lesser amounts of air at atmospheric pressure are admitted to said vacuum chamber as the mean of the pulsating vacuum level in said chamber departs more or less from and above the desired level.

2. A regulating valve according to claim 1 in which the sensitivity to excitation of said valve closure is dependent upon the ratio of the spring constants of said mechanical spring means and said pneumatic spring means.

3. A regulating valve according to claim 1 in which said pneumatic spring means has a relatively higher spring constant variable with changes in the mean separation of said valve closure and said valve seat and said mechanical spring has a relatively lower spring constant substantially independent of changes in the mean separation of said valve seat and said valve closure.

4. A regulating valve according to claim 1 in which said spring biased and diaphragm mounted valve closure comprises a tuned harmonic oscillator excited by pressure pulsations in said vacuum chamber and having a range of resonant frequencies corresponding to a range of mean oscillating separations between said closure and said valve seat established in response to a range of mean pressures and a corresponding range of pressure pulsation frequencies in said vacuum chamber, each of said resonant frequencies being different from its corresponding pressure pulsation frequency.

5. A regulating valve according to claim 1 in which said pneumatic spring means comprises a sealed chamber having said diaphragm as one wall thereof and in communication with said vacuum chamber only through a fine orifice.

6. In combination with a source of vacuum variable within a predetermined range of levels and pulsating within a corresponding predetermined range of frequencies, a vacuum regulating valve connected to said source and having valving means for introducing and throttling atmospheric air into the vacuum supplied by said source in the proper amounts required to deliver a predetermined and substantially constant vacuum, said valving means comprising an atmospheric port surrounded by a valve seat, a movable valve closure biased by pneumatic means responsive to the level of vacuum supplied said valve by said source tending to urge said valve closure in one direction with respect to said valve seat and spring means providing a substantially constant predetermined force proportional to the desired vacuum delivery level tending to move said valve closure in the other direction with respect to said valve seat so that said valve closure moves toward and away from said valve seat in accordance with the departure of the mean level of vacuum supplied by said source from the desired delivery level, said valve closure and said means biasing its movements having a mass and spring constants which combine to cause said valve closure to operate in the manner of a substantially undamped and tuned harmonic oscillator having a range of resonant frequencies varying with the mean separation of said valve closure and said valve seat, each of said resonant frequencies being substantially different from its corresponding one of the predetermined range of exciting frequencies of the pulsations introduced into the vacuum system by the vacuum source whereby the amplitude of oscillation of said valve closure when excited at each of various frequencies within the predetermined range provided by the vacuum source can be controlled and maintained with respect to the correspondingly required separation between said valve closure and said valve seat at each of said frequencies so that said valve closure is maintained substantially out of contact with said valve seat throughout the predetermined operating range of said vacuum system.

7. A vacuum regulating valve comprising a vacuum chamber having an outlet port and an inlet port together providing a fluid flow path through said vacuum chamber and having an atmospheric port opening to atmosphere, a valve seat surrounding said atmospheric port, a valve closure mounted on a diaphragm for movement toward and away from said valve seat for throttling air flow through said atmospheric port, pneumatic spring means responsive to changes in the steady state level of pressure in said vacuum chamber and tending to draw said diaphragm and said valve closure away from said valve seat in accordance with the mean pressure differential across said atmospheric port and including means to limit the response of said pneumatic spring means to transient changes in the level of pressure in said vacuum chamber and mechanical spring means tending to urge said valve closure toward said valve seat with a substantially constant and predetermined force and to restrain said valve closure member against lateral movement with respect to said valve seat independently of the force of gravity whereby greater or lesser amounts of air at atmospheric pressure are admitted to said vacuum chamber as the mean vacuum level in said chamber departs more or less from and above a desired level.

8. A regulating valve according to claim 7 in which said pneumatic spring means and said mechanical spring means have substantially different spring constants.

9. A regulating valve according to claim 7 in which said pneumatic spring has a relatively short, high spring rate and said mechanical spring has a relatively long, low spring rate and both springs have a relatively flat force displacement characteristic.

10. A regulating valve according to claim 7 in which said diaphragm is circular and clamped and held about its circumferential peripheral margin in fixed relationship with said valve seat and in which said valve closure includes rigid circular discs clamped together on opposite sides of said diaphragm having a diameter greater than said valve seat and only slightly less than the portion of said diaphragm clamped and fixed with respect to said valve seat for restraining said valve closure means against lateral movement with respect to said valve seat.

11. The apparatus according to claim 10 in which said valve closure means includes an externally threaded element projecting normally from the central portion of said diaphragm and toward and in axial alignment with said valve seat and in which said mechanical spring comprises a helical tension spring having a close coupled connection with said projecting element of said valve closure by engagement of a plurality of its coils at one end with a plurality of the external threads on said projecting element for aligning the axis and line of action of said spring with the axis of said projecting member and normal to said diaphragm.

12. A regulating valve according to claim 11 including a rotatable shaft axially fixed and aligned with respect to said mechanical spring and having external threads for tension-resisting threaded engagement with a plurality of coils at the other end of said mechanical spring whereby rotation of said shaft varies the tension in said mechanical spring while restraining the engaged end of said spring against lateral and tipping movement whereby said mechanical spring tends to guide and steer said valve closure.

13. A regulating valve according to claim 7 in which said valve closure comprises a substantially flat portion adapted to engage the peripheral margin of said valve seat and a thickened portion having straight cylindrical side walls axially aligned with said valve seat and adapted to fit closely within said valve seat and extended into said atmospheric port.

References Cited in the file of this patent

UNITED STATES PATENTS

| 2,511,435 | Griswold | June 13, 1950 |
| 2,619,316 | Wilson | Nov. 25, 1952 |
| 2,995,145 | Heiser | Aug. 8, 1961 |